(12) United States Patent
Siu et al.

(10) Patent No.: US 12,121,180 B2
(45) Date of Patent: Oct. 22, 2024

(54) TEMPERATURE MONITORING AND CONTROL SYSTEM FOR A KITCHEN DEVICE

(71) Applicant: BREVILLE PTY LIMITED, Alexandria (AU)

(72) Inventors: Eddie Siu, Alexandria (AU); Richard Llewelyn Jones, Alexandria (AU); Warren Preston, Alexandria (AU); Con Psarologos, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 600 days.

(21) Appl. No.: 17/256,637

(22) PCT Filed: Jun. 28, 2019

(86) PCT No.: PCT/AU2019/050683
§ 371 (c)(1),
(2) Date: Dec. 28, 2020

(87) PCT Pub. No.: WO2020/000052
PCT Pub. Date: Jan. 2, 2020

(65) Prior Publication Data
US 2021/0259460 A1    Aug. 26, 2021

(30) Foreign Application Priority Data

Jun. 29, 2018   (AU) ................................ 2018902369
Jun. 27, 2019   (AU) ................................ 2019902250

(51) Int. Cl.
*A47J 36/32*     (2006.01)
*A47J 27/00*     (2006.01)
(Continued)

(52) U.S. Cl.
CPC .............. *A47J 36/32* (2013.01); *A47J 27/004* (2013.01); *A47J 43/046* (2013.01);
(Continued)

(58) Field of Classification Search
None
See application file for complete search history.

(56) References Cited

U.S. PATENT DOCUMENTS

2004/0065658 A1* 4/2004 Damiano ............ A47J 36/2483
219/524
2009/0242546 A1 10/2009 Yungbluth et al.
(Continued)

FOREIGN PATENT DOCUMENTS

CN     203555568 U     4/2014
CN     106963239 A  *  7/2017 .......... A47J 36/2483
(Continued)

OTHER PUBLICATIONS

European Search Report for EP 19825533.3 dated Mar. 2, 2022.
(Continued)

*Primary Examiner* — John J Norton
(74) *Attorney, Agent, or Firm* — Tarolli, Sundheim, Covell & Tummino LLP

(57) ABSTRACT

A kitchen device comprising a cooking vessel, a heating plate, a first temperature sensor and a second temperature sensor, wherein the first temperature sensor is thermally connected to, at least part of, the heating plate of the kitchen device for measuring the temperature of the heating plate, and the second temperature sensor is located in a position to measure the temperature of one or more ingredients that are inside the cooking vessel and the second temperature sensor is thermally isolated from the cooking vessel by a sensor isolation seal.

17 Claims, 13 Drawing Sheets

(51) Int. Cl.
*A47J 43/046* (2006.01)
*A47J 43/07* (2006.01)
*A47J 44/00* (2006.01)
*G01K 13/00* (2021.01)
*H05B 1/02* (2006.01)

(52) U.S. Cl.
CPC .......... *A47J 43/0727* (2013.01); *A47J 44/00* (2013.01); *G01K 13/00* (2013.01); *H05B 1/0261* (2013.01); *A47J 2202/00* (2013.01); *G01K 2207/06* (2013.01)

(56) References Cited

U.S. PATENT DOCUMENTS

| | | | | |
|---|---|---|---|---|
| 2009/0272730 A1* | 11/2009 | Friel | ................. | A47J 27/21075 219/439 |
| 2009/0302025 A1* | 12/2009 | Corkin | ............. | A47J 27/21066 219/448.11 |
| 2011/0185915 A1* | 8/2011 | Eades | ............... | A47J 27/21058 99/331 |
| 2011/0186668 A1 | 8/2011 | Seidler et al. | | |
| 2014/0353316 A1 | 12/2014 | Nengchao | | |
| 2017/0339751 A1 | 11/2017 | Lichan | | |

FOREIGN PATENT DOCUMENTS

| | | | | |
|---|---|---|---|---|
| DE | 10 2008 038 783 A1 | 2/2010 | | |
| DE | 102010037769 A1 | 3/2012 | | |
| EP | 0757901 A1 * | 2/1997 | .......... | A47J 37/1261 |
| EP | 2 196 113 A2 | 6/2010 | | |

OTHER PUBLICATIONS

International Search Report for Application No. PCT/AU2019/050683, mailing date Aug. 26, 2019.
CN Office Action for corresponding CN Application No. 201980041958.6, dated Mar. 9, 2024, 7 pgs.

* cited by examiner

TEMPERATURE MONITORING AND CONTROL SYSTEM FOR A KITCHEN DEVICE

TECHNICAL FIELD

The present invention relates generally to a temperature monitoring and control system for a kitchen device.

BACKGROUND

Recently, kitchen devices (or machines) performing a variety of stirring, processing, blending and/or heating of ingredients have become popular in the consumer and commercial markets. One such kitchen device may be a multicooker, for example. The popularity of multicookers is partly due to their ability to cook many different types of meals using a number of different cooking processes with minimum interaction from the user. In order to do this, known kitchen devices may measure the temperature of the heating billet used to cook the food.

However, some cooking processes may not be accurately temperature monitored within the kitchen device in order to enable the cooking processes to be controlled by the kitchen device accurately. This may result in reduced quality meals being produced by the kitchen device following the cooking process.

Currently, kitchen devices in the market use temperature sensor(s) that measure the temperature of the heating element, and this measured temperature is assumed to be the temperature at which the ingredients are being cooked, which may affect the actual cooking process both in terms of power delivered and cooking time.

SUMMARY

There is a need for optimization to enhance the cooking process by a kitchen device.

It is an object of the present invention to substantially meet this need or to overcome, or at least ameliorate, one or more disadvantages of existing arrangements.

Disclosed are arrangements which seek to address the above problems by providing an improved temperature monitoring and control system for a kitchen device by providing dual temperature sensors to control the cooking process more accurately.

According to a first aspect of the present disclosure, there is provided a kitchen device comprising a cooking vessel, a heating plate, a first temperature sensor and a second temperature sensor, wherein the first temperature sensor is thermally connected to, at least part of, the heating plate of the kitchen device for measuring the temperature of the heating plate, and the second temperature sensor is located in a position to measure the temperature of one or more ingredients that are inside the cooking vessel and the second temperature sensor is thermally isolated from the cooking vessel by a sensor isolation seal.

Preferably, the position of the second temperature sensor is within an aperture of the cooking vessel and the heating plate.

Preferably, an air gap is provided between the sensor isolation seal and the heating plate.

Preferably, the sensor isolation seal has two or more sensor isolation seal components, where a first sensor isolation seal is made of a first material and the second sensor isolation seal is made of a second material different to the first material and the first sensor isolation seal is located within an internal aperture of the second sensor isolation seal.

Preferably, an air gap is provided between the second sensor isolation seal and the heating plate.

Preferably, the kitchen device has a controller, wherein the controller is arranged to: monitor a first temperature from the first temperature sensor; monitor a second temperature from the second temperature sensor; receive a selected cooking temperature; monitor the first and second temperatures from the first and second temperature sensors with respect to the selected cooking temperature; and control operation of the heating plate based on monitoring of at least one of the first and second temperatures with respect to a heat profile.

Preferably, the kitchen device has a first PID controller for controlling the temperature of the heating plate based on the temperature of the first temperature sensor, a second PID controller for controlling the temperature of the heating plate based on the temperature of the second temperature sensor, wherein, the controller determines which of the first and second PID controllers are used to control the temperature of the heating plate based on the selected cooking temperature.

Preferably, the controller is further arranged to retrieve the at least one heat profile from memory, compare at least one of the first and second temperatures with the heat profile, and adjust control of the heating plate based on the comparison.

Preferably, the controller determines which of, one or both of, the first and second temperature sensors to monitor to control the temperature of the heating plate based on the selected cooking temperature.

Preferably, the heating plate has a heating element and a heating billet, and the first temperature sensor is thermally connected to the heating billet.

According to a second aspect of the present disclosure, there is provided a method of controlling a cooking process in a kitchen device, the method comprising: receiving a selected cooking temperature; receiving a first temperature reading of a heating plate and a second temperature reading of one or more ingredients being cooked in the cooking process; monitoring the first and second temperatures with respect to the selected cooking temperature; and controlling operation of the heating plate in accordance with at least one heat profile based on the monitoring of the first and second temperatures.

Preferably, the method further includes the steps of controlling the temperature of the heating plate based on the temperature of the first temperature sensor, controlling the temperature of the heating plate based on the temperature of the second temperature sensor, wherein determining which of the first and second temperature sensors are to be used to control the temperature of the heating plate is based on the selected cooking temperature.

Preferably, the method further includes the steps of retrieving the at least one heat profile from memory, comparing at least one of the first and second temperatures with the heat profile, and adjusting control of the heating plate based on the comparison.

Preferably, the method further includes the steps of determining which of, one or both of, the first and second temperature sensors to monitor to control the temperature of the heating plate based on the selected cooking temperature.

Other aspects are also disclosed.

BRIEF DESCRIPTION OF THE DRAWINGS

At least one embodiment of the present invention will now be described with reference to the drawings and appendices, in which.

DETAILED DESCRIPTION INCLUDING BEST MODE

Figure 1:
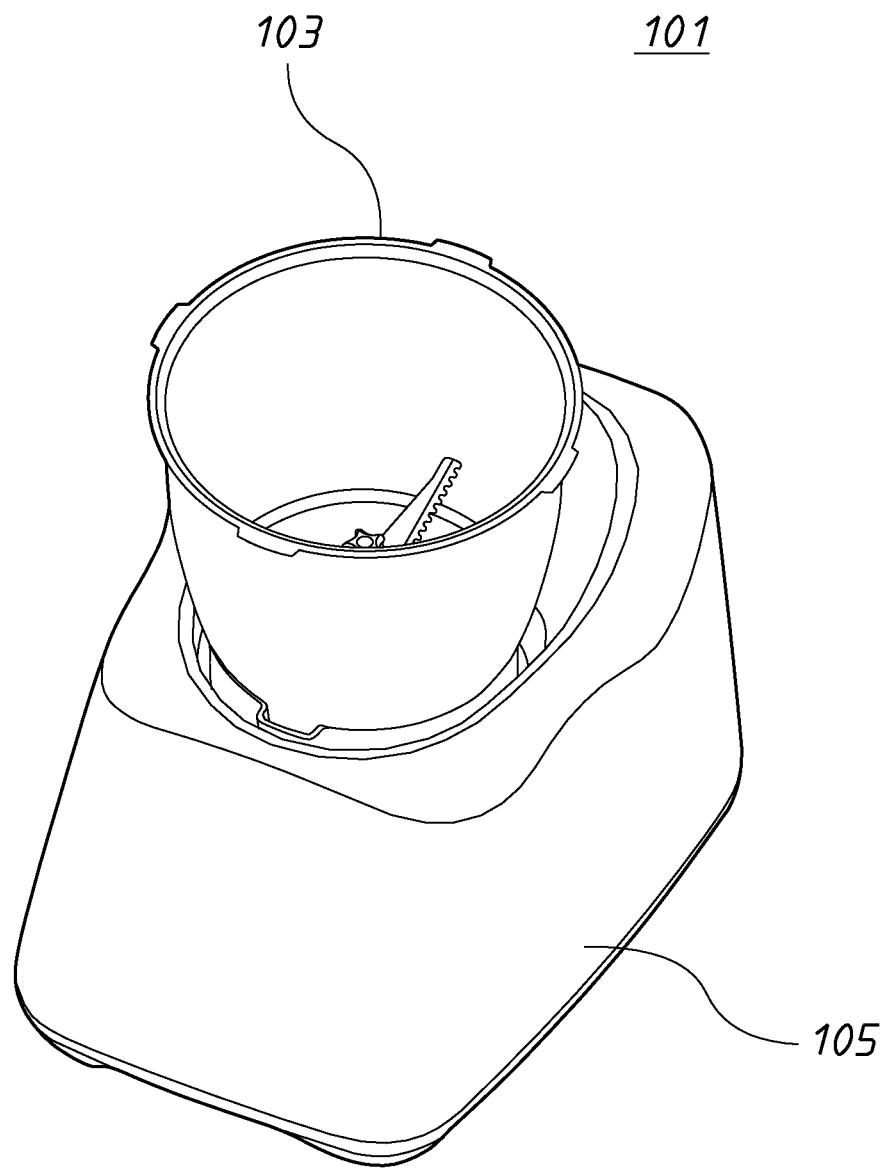
FIG. 1 shows a kitchen device according to an embodiment of the present disclosure.

Where reference is made in any one or more of the accompanying drawings to steps and/or features, which have the same reference numerals, those steps and/or features have for the purposes of this description the same function(s) or operation(s), unless the contrary intention appears.

It is to be noted that any discussions contained in the "Background" section relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

An example of a kitchen device (or machine) in the form of a multicooker is shown in FIG. 1. The kitchen device 101 has a cooking vessel 103 in which the food matter (ingredients) being cooked is placed by a user. The cooking vessel 103 is located in a base 105. The base 105 includes the control circuitry and power supply for controlling the cooking of the food matter inside the cooking vessel based on settings provided by the user via a user interface (not shown). These settings may be automatically adjusted by the control circuitry based on various input parameters (e.g. set temperature, measured temperature(s), cooking mode(s)) as described herein.

Figure 2:
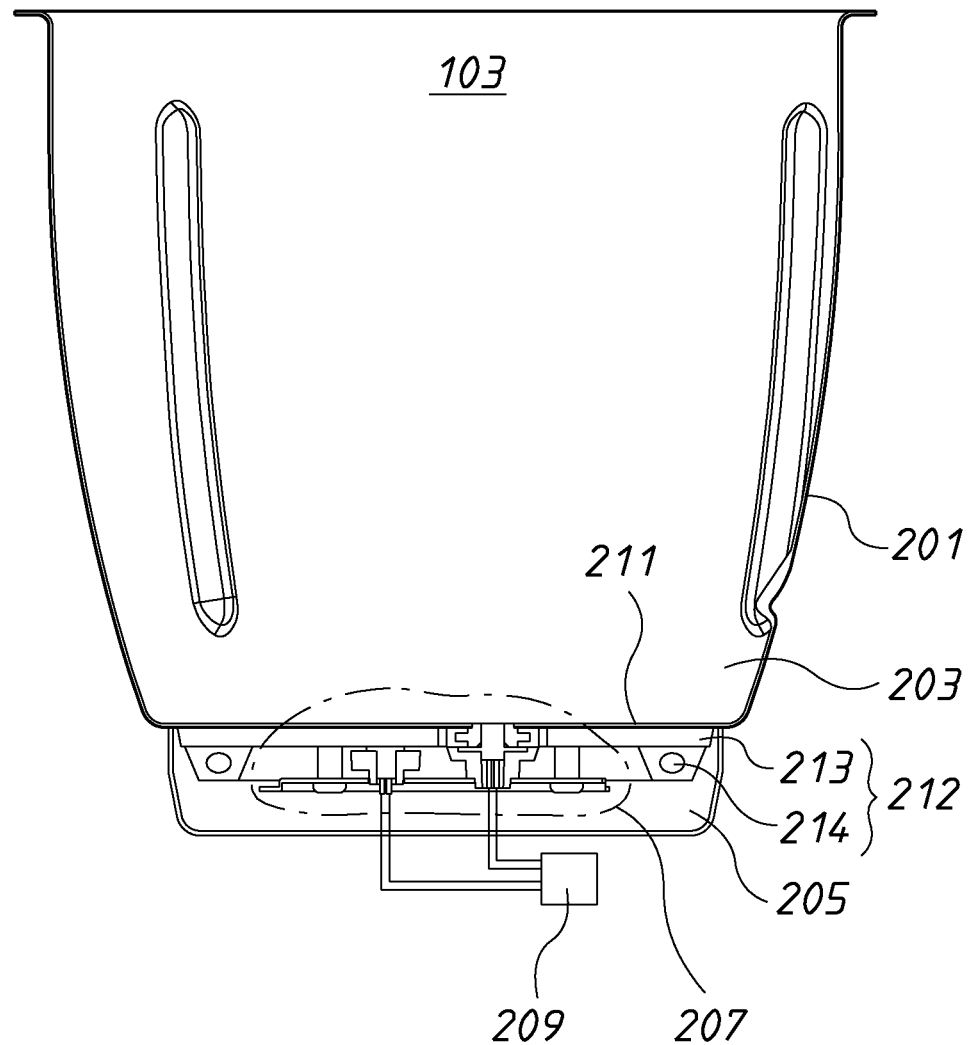
FIG. 2 shows a cooking vessel of a kitchen device according to an embodiment of the present disclosure.

FIG. 2 shows the cooking vessel 103 with an outer shell 201 and an inner cavity 203 for retaining the one or more ingredients when being processed by the kitchen device 101. The cooking vessel 103 has a base 205 in which a temperature monitoring system 207 is located. The temperature monitoring system 207 is in communication with the control circuitry 209 located in the base 105 of the kitchen device.

At the bottom of the inner cavity 203 is a vessel floor 211 (i.e. a lower surface) upon which the ingredients (not shown) are generally placed. Beneath the floor 211 is a heater plate 212 that includes an embedded heating element 214 and an aluminium heating billet 213, which, when power is applied at a level controlled by a processor (not shown), heats up the floor 211 of the vessel 103 to cook the ingredients in accordance with the cooking mode selected.

Figure 3:
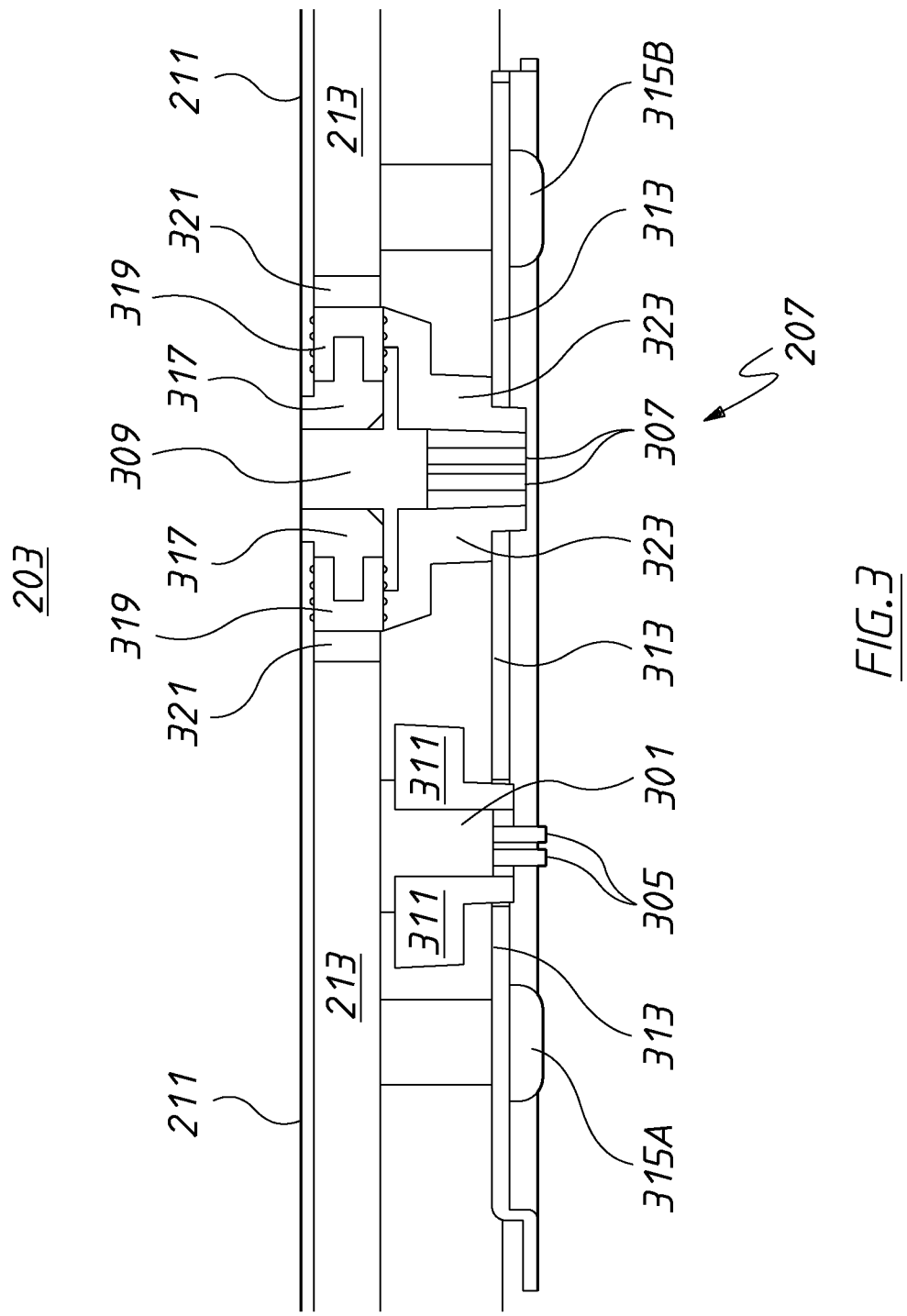
FIG. 3 shows a temperature monitoring system according to an embodiment of the present disclosure.

FIG. 3 shows further details of the temperature monitoring system 207.

Inside the base 205 of the cooking vessel 103 is a first (heater) temperature sensor 301 that is in thermal contact with the heating billet 213. The first temperature sensor 301 is connected to the controller (not shown) by control connections 305. The heating billet 213 is in thermal connection with the vessel floor 211 so that when the heating element is turned on by the controller, the heating billet 213 heats up the vessel floor to cook the ingredients within the inner cavity 203 of the vessel.

A second (ingredient) temperature sensor 309 is located within an aperture formed in the floor 211 of the cooking vessel as well as an aperture formed through the heating billet 213. The second temperature sensor 309 is connected to the controller (not shown) by control connections 307.

The first temperature sensor 301 is supported by a support system, which has a first support seat 311 for supporting the first temperature sensor 301 and a support bracket 313 to engage the first temperature sensor 301 against the heating billet 213 of the heating element 212. That is, the first support seat 311 supports the first temperature sensor 301 via the support bracket 313 by securing the support bracket relative to the heating element 212 using heat isolated securing elements (315A and 315B).

The second temperature sensor 309 is shown in FIG. 3 with a sensor isolation seal that consists of two sensor isolation seal components. A first sensor isolation seal 317 and a second sensor isolation seal 319. The first sensor isolation seal 317 is located within an internal aperture of the second sensor isolation seal 319. An air gap 321 is provided between the second sensor isolation seal 319 and the heating billet 213. The first sensor isolation seal 317 may be a polymer isolation ring, for example. The second sensor isolation seal 319 may be formed from any suitable elastomeric material. For example, the second sensor isolation seal may be a silicon seal. An improved seal arrangement is provided by having two sensor isolation seal components of different thermal mass. This arrangement provides heat isolation from the vessel floor and the heating element for the second temperature sensor and improves responsiveness, which may be important when cooking certain meals or for certain modes of operation.

It will be understood that in alternative embodiments, the sensor isolation seal may consist of a single seal component of any suitable material, or may consist of three or more seal components of any suitable materials.

The second temperature sensor 309 is also supported by the support system. A second support seat 323 supports the second temperature sensor 309 via the support bracket 313, which engages the second temperature sensor 309 against the isolation seal (317/319). Therefore, the second support seat 323 supports the sensor isolation seal (317/319) and the second temperature sensor 309 via the support bracket 313.

In FIG. 3, where the sensor isolation seal is a first sensor isolation seal and a second sensor isolation seal, the second support seat 323 supports the second sensor isolation seal 319 and the second temperature sensor 309 via the support bracket 313 without contacting the first sensor isolation seal 317.

In the described arrangement, the first temperature sensor 301 is located at a first position in the kitchen device, and the second temperature sensor 309 is located at a second position in the kitchen device. The first position and the second position are different positions in the kitchen device, where the first position enables the first temperature sensor to measure a first temperature profile during operation. The second position enables the second temperature sensor to measure a second temperature profile during operation. Each of the first and second temperature profiles, or portions thereof, may be captured during one or more cooking modes. These measured profiles may then be compared with one or more stored temperature profiles. The temperature profiles may be stored in a memory (not shown) that is accessible by the controller (not shown). For example, the temperature profiles may be stored locally or in an external memory.

The first temperature sensor 301 is in thermal contact with the heating billet 213 of the kitchen device for directly measuring the temperature of the heating billet 213. The first temperature sensor 301 may be directly connected to an underside of the heating billet 213.

The second temperature sensor 309 is positioned to be in thermal contact with one or more ingredients being cooked by the kitchen device in the cooking vessel of the kitchen device to measure the temperature of the ingredients. The second temperature sensor 309 is thermally isolated from the cooking vessel and the heating element by the sensor isolation seal (317/319).

The second temperature sensor 309 may be located within an internal aperture of the sensor isolation seal. An air gap 321 may be provided between the sensor isolation seal and the heating billet.

The external circumference of the sensor isolation seal (317/319) is positioned so that it is within the aperture of the floor of the cooking vessel. The sensor isolation seal may be at least partially in contact with the floor of the cooking vessel.

Figure 4:
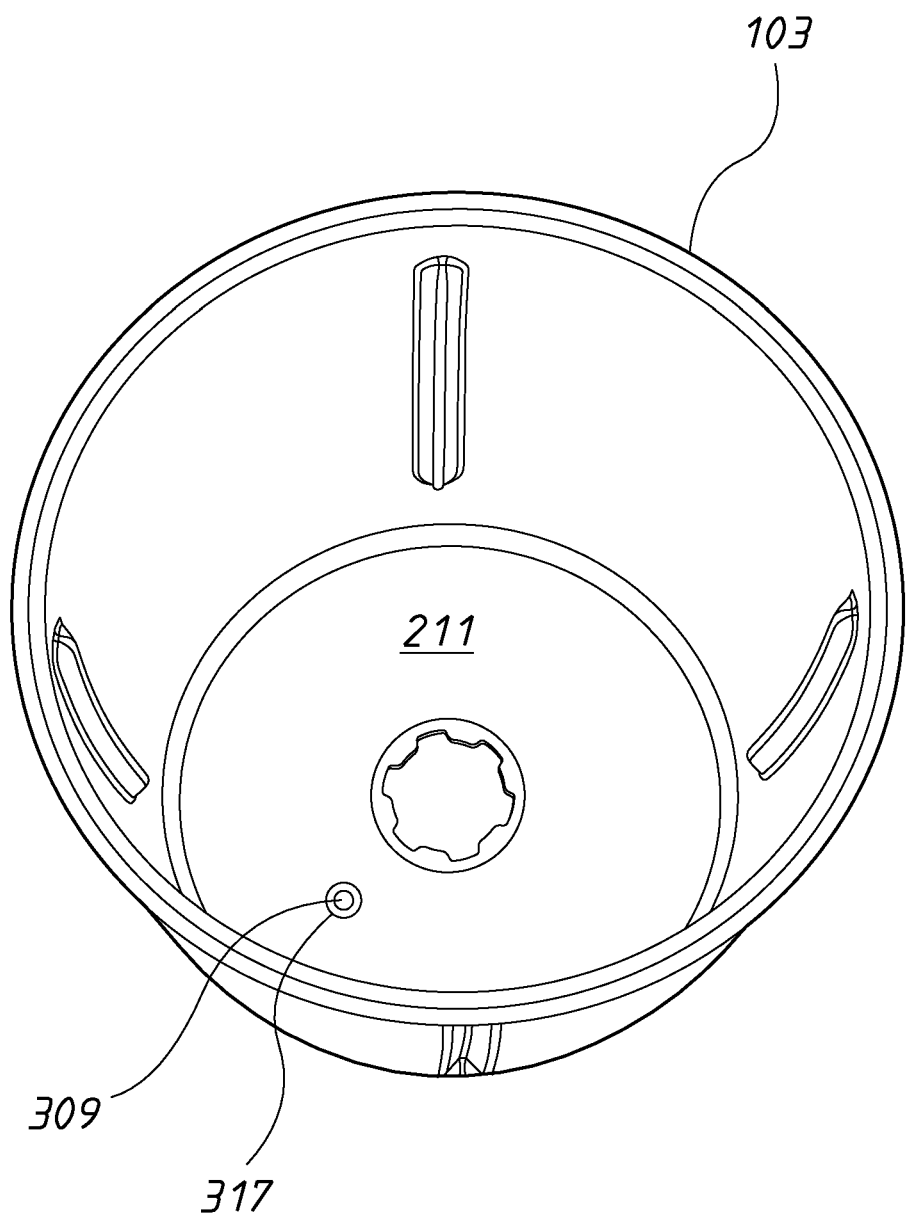
FIG. 4 shows the inside of a cooking vessel according to an embodiment of the present disclosure.

As can be seen in FIG. 4, the second temperature sensor 309 is heat isolated from the floor 211 of the cooking vessel by at least part of the sensor isolation seal (317).

Figure 5:
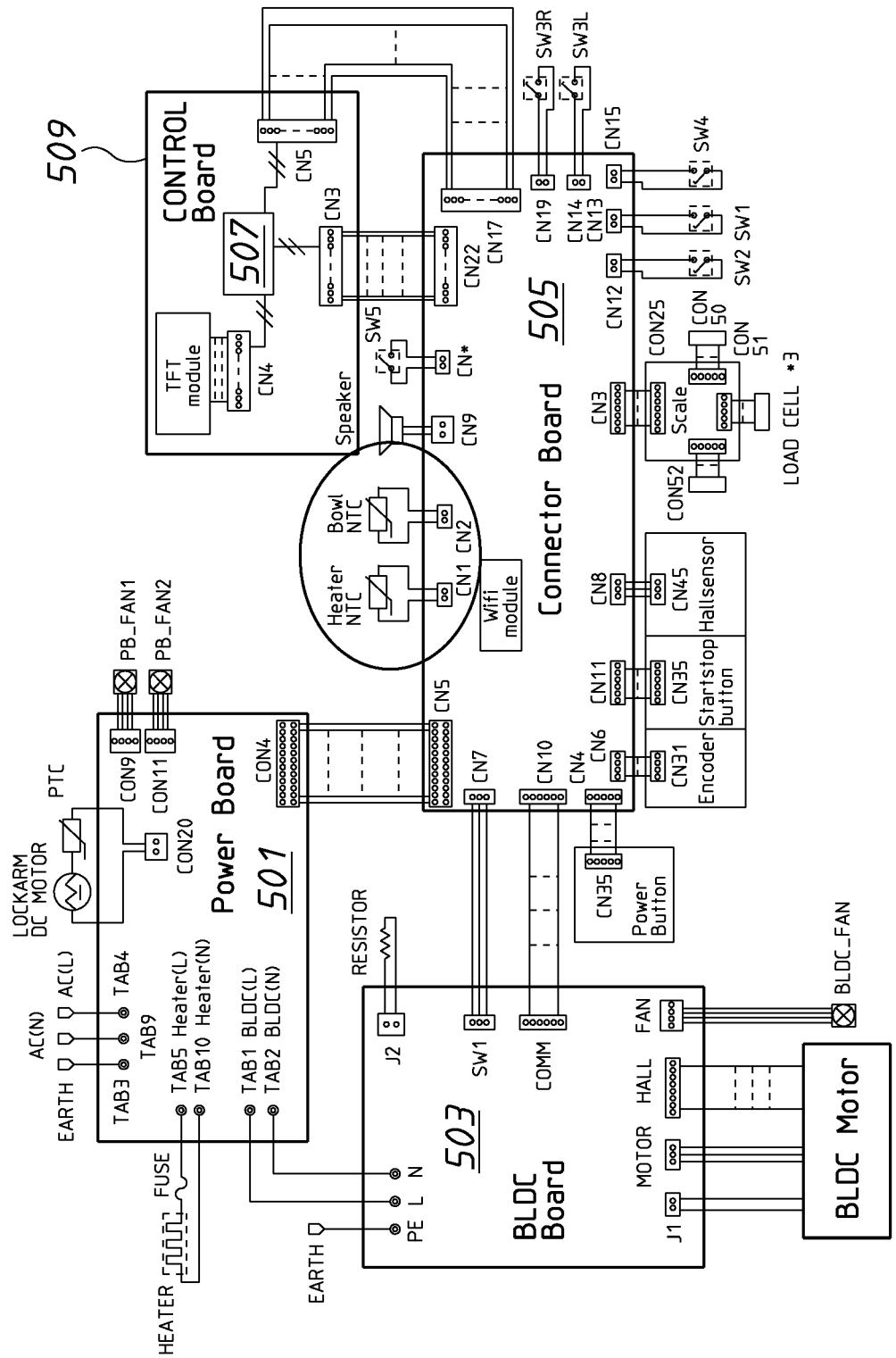
FIG. 5 shows a control circuit according to an embodiment of the present disclosure.

FIG. 5 shows a circuit block diagram of a control circuit for controlling how a kitchen device operates based on temperature feedback from two or more temperature sensors.

A power supply board 501 provides regulated power to other system components. A BLDC board 503 controls operation of a brushless DC (BLDC) motor. A connector board 505 then connects various components, including the first and second temperature sensors (termed "Heater NTC" and "Bowl NTC" respectively) to other components such as a controller 507 located on a control board 509.

Figure 6:
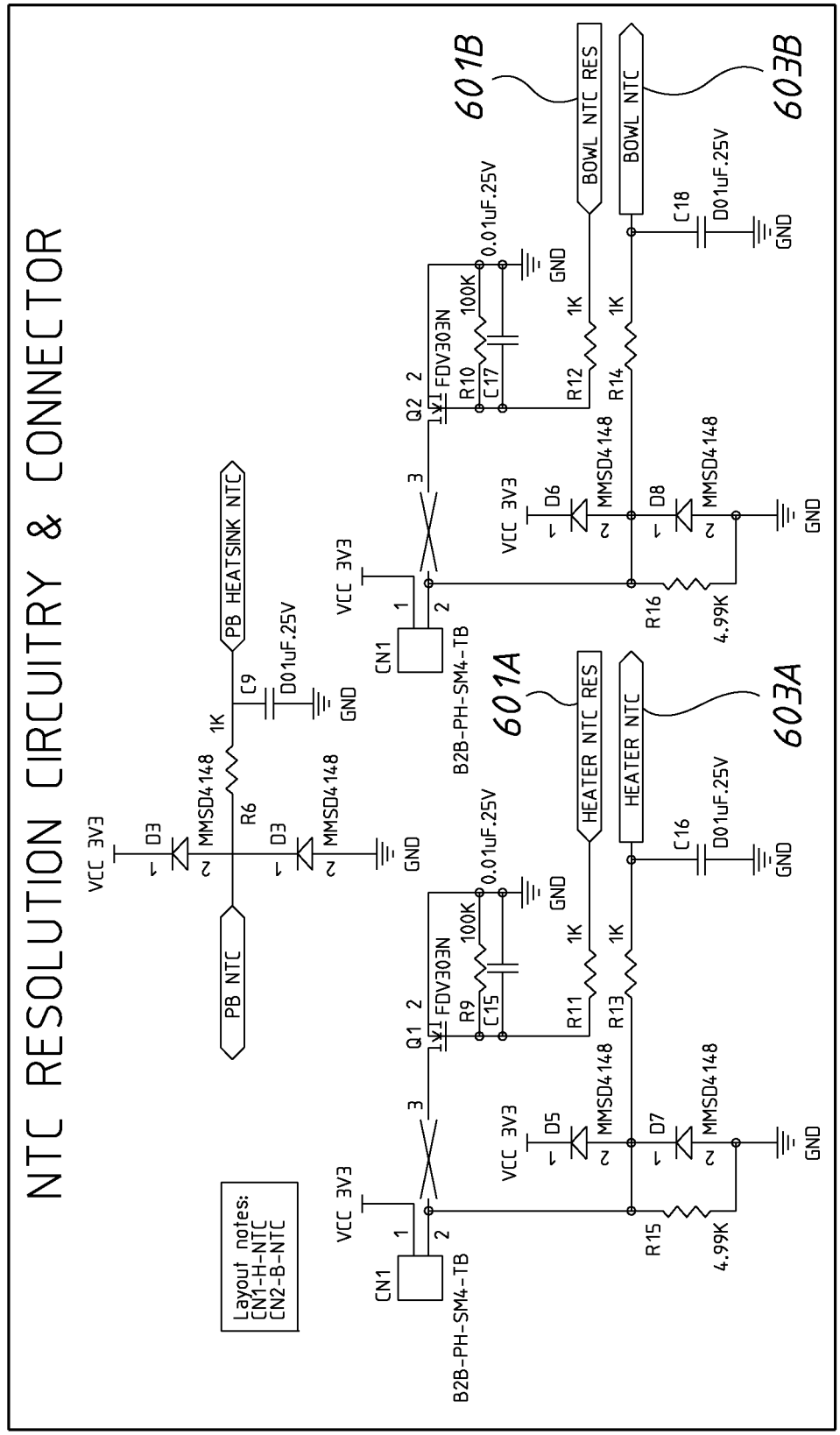
FIG. 6 shows a further control circuit according to an embodiment of the present disclosure.

The first and second temperature sensor circuits are shown in FIG. 6. The circuits show the input signals (603A, 603B) and output signals (601A, 601B) being fed to and from the NTC sensors, which are communicated from and to the connector board 505, which in turn communicate with the controller 507.

An improved method of controlling cooking in a kitchen device with two separate temperature sensors is also provided herein.

Kitchen devices such as multicookers may operate by switching between different cooking modes while making a meal. For example, an initial cooking mode may be to sauté onions and garlic on a medium heat, followed by a high heat cooking mode to brown meat, with a subsequent low heat cooking mode to slow cook the onions garlic and meat with other ingredients. Therefore, depending on the meal being prepared, each cooking mode may require different temperature profiles for quality cooking of the ingredients in the meal.

The temperature of the heating billet is an important factor for monitoring the cooking process, and so the first temperature sensor reads the billet temperature and feeds the temperature data to the controller 507.

Also, the temperature of the ingredients being cooked is an important factor for the cooking process, and so the second temperature sensor reads the temperature of the ingredients being cooked by directly being in contact with the ingredients, and feeds the temperature data to the microcontroller 507. This is particularly useful where the meal being cooked has at least a partial liquid consistency ensuring the ingredients are in contact with the second temperature sensor 309. It will be understood that the kitchen device may have further "second" temperature sensors located at different positions around the cooking vessel for directly measuring the temperature of the ingredients to more reliably capture the temperature of the ingredients in meals where the ingredients are less liquid.

The kitchen device controller monitors both the temperature of the heating billet (rather than just the cooking vessel) and the temperature of the actual ingredients by way of the two temperature sensors during operation and changes operation accordingly to provide an improved cooking process depending on the measured temperatures. Therefore, the kitchen system controller is operable to more accurately control the cooking of the ingredients depending on the selected cooking mode and/or the selected cooking temperature. Further the kitchen system controller may also more accurately control the cooking of the ingredients when the kitchen device operates when switching from a first defined cooking mode to another different defined cooking mode.

Figure 7:
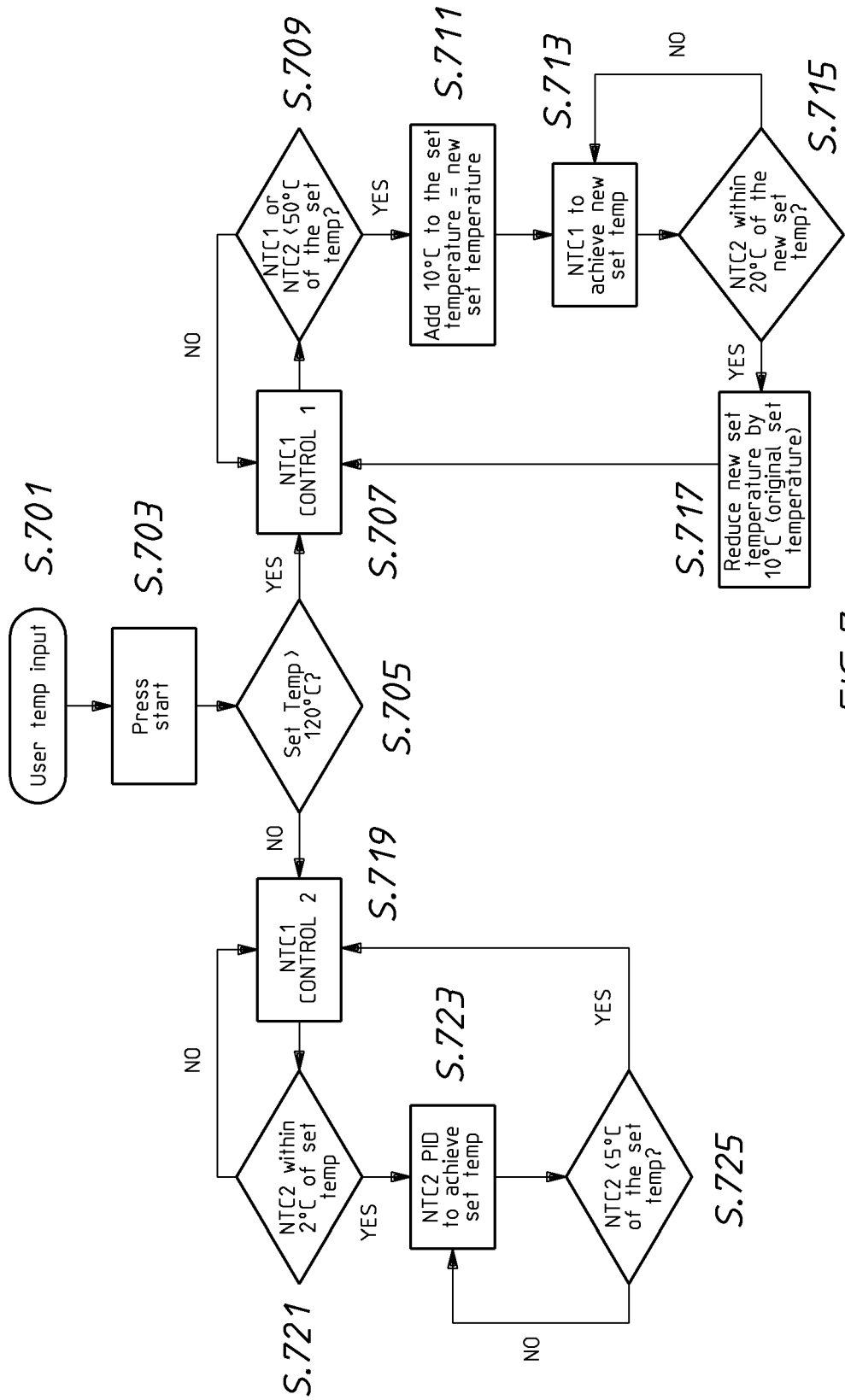
FIG. 7 shows a temperature control process according to an embodiment of the present disclosure.

For example, as shown in FIG. 7, a user temperature input (e.g. based on a cooking mode or a selected temperature) is provided to the controller 507 at step S701. The set temperature is a desired ingredient temperature. At step S703, the user selects START to start the cooking process. The controller 507 determines at step S705 whether the temperature set at step S701 is greater than a predetermined temperature. For example, the predetermined temperature may be, for example, 120 degrees Celsius. It will be understood that the predetermined temperature may be any suitable temperature depending on the cooking mode of the kitchen device.

If the controller 507 determines at step S705 that the temperature set at step S701 is greater than the predetermined temperature, for example 120 degrees Celsius, the process moves to step S707 where the controller controls operation of the first temperature sensor using a first temperature profile. This includes monitoring both the direct temperature of the heating element (via NTC1) and the temperature of the ingredients (via NTC2). As the set temperature is a high temperature (greater than 120 degrees Celsius), this indicates that a fast rise in temperature of the heating element is required, such as for browning meat. As such, the subsequent control steps reflect operations that aim to get the kitchen device heating element up to temperature as quickly as possible as long as the ingredient temperatures are not already close to that set temperature.

At step S709, the controller 507 determines from the temperature feedback from both of the first and second temperature sensors whether the temperature of the heating element (first temperature sensor feedback) or the temperature of the ingredients (second temperature sensor feedback) are less than a predetermined temperature value, for example 50 degrees Celsius, of the set temperature. It will be understood that the predetermined temperature value may be any suitable temperature value depending on the cooking mode of the kitchen device. If the controller determines that the temperature of the heating element (first temperature sensor feedback) or the temperature of the ingredients (second temperature sensor feedback) are less than 50 degrees Celsius of the set temperature, at step S711, the controller adjusts the set temperature to a new set temperature, e.g. by increasing the set temperature by 10 degrees Celsius. At step S713, the controller 517 continues to control the temperature of the heating element by monitoring the temperature of the billet 213 using first temperature sensor 301 (NTC1) to reach the new set temperature. At step S715, the controller 517 determines if the temperature of the second temperature sensor (measuring the temperature of the ingredients) is within a predetermined temperature value, for example, 20 degrees Celsius, of the new set temperature. If the controller determines that the temperature of the second temperature sensor is not within the predetermined temperature value, e.g. 20 degrees Celsius, of the new set temperature, the controller continues to control the temperature of the heating element by monitoring the temperature of the billet 213 using the first temperature sensor 301 (NTC1) to reach the new set temperature at step S713 and monitor the second temperature sensor at step S715. If at step S715 the controller determines that the temperature of the second temperature sensor is within the predetermined temperature value, e.g. 20 degrees Celsius, of the new set temperature, the controller at step S717 reduces the new set temperature by a predetermined amount, e.g. 10 degrees Celsius, to the original set temperature and returns control to step S707.

If the controller 507 determines at step S705 that the temperature set at step S701 is not greater than a predetermined temperature value, for example 120 degrees Celsius, the process moves to step S719 where the controller controls operation of the first temperature sensor that monitors the temperature of the heating billet 213. As the set temperature is a low temperature (for example, less than 120 degrees Celsius), this indicates that a fast rise in temperature of the heating element is not required, such as for making a custard. Therefore, the heating element temperature is not further adjusted at this stage, but is controlled based on a heat profile associated with the set temperature. The controller instead monitors the temperature of the ingredients using the second temperature sensor. At step S721, the controller determines if the second temperature sensor 309 (NTC2) that measures the ingredient temperature is within a predetermined temperature value, for example 2 degrees Celsius, of the set temperature. If the controller determines that the second temperature sensor 309 (NTC2) that measures the ingredient temperature is not within the predetermined temperature value, e.g. 2 degrees Celsius, of the set temperature, the controller continues to control the heating operation of the heating element at step S719. If the controller determines that the second temperature sensor that measures the ingredient temperature (NTC2) is within the predetermined temperature value, e.g. 2 degrees Celsius, of the set temperature, the controller continues to control the heating operation of the heating element at step S723 using an alternative heat profile for the heating element (e.g. reduced heating) to approach the set temperature at a desired rate. At step S725, the controller determines if the temperature of the second temperature sensor (the temperature of the ingredients) is less than a predetermined temperature value, e.g. 5 degrees Celsius, from the set temperature. If the controller determines that the temperature of the second temperature sensor (the temperature of the ingredients) is less than the predetermined temperature value, e.g. 5 degrees Celsius, from the set temperature, the controller controls the cooking process using the first heat profile of step S719. If the controller determines that the temperature of the second temperature sensor (the temperature of the ingredients) is not less than the predetermined temperature value, e.g. 5 degrees Celsius, from the set temperature, the controller controls the cooking process using the second heat profile of step S723.

Further non-limiting example scenarios are provided as follows.

Scenario 1: Set temperature: 70° C.; Ingredients: nothing.

The control system controls the heating element using the first temperature sensor PID temperature control until the second temperature sensor senses 68° C.

The second temperature sensor PID then takes over at 68° C. to continue heating the heating element to achieve 70° C. as measured by the second temperature sensor. It should be noted that it will take a long time to reach within 2° C. of the set temperature when there is nothing inside the cooking vessel as there are no ingredients to carry the heat to the second temperature sensor from the heat source.

If cold water is then poured into the cooking vessel, the second temperature sensor reading will drop <5° C. threshold, and the first temperature sensor PID may regain control. The cycle will then start back from the beginning if there is intervention on the set temperature.

Scenario 2: Set temperature: 70° C.; Ingredients: water.

The control system controls the heating element using the first temperature sensor PID temperature control until the second temperature sensor senses 68° C.

The control system switches to the second temperature sensor PID control to achieve 70° C. measurement.

As water is in the vessel, the second temperature sensor PID will be used to maintain 70° without any problems.

If cold water is then added to the cooking vessel, the temperature monitored by the second temperature sensor may drop back below the 5° C. threshold (65° C. in this example), where the first temperature sensor PID will regain control until the temperature being sensed by the second temperature sensor reaches 68° C. again. The cycle will start back from beginning if there is intervention on the set temperature.

Scenario 3: Set temperature: 140° C.; Ingredients: browning meat.

The control system controls the heating element using the first temperature sensor PID temperature control to maintain predicted cooking surface temperature of 140° C.

If a user adds 500 g of meat, the temperature measurement by the second temperature sensor or the temperature measurement by the first temperature sensor will likely drop below 50° C. threshold, and so the controller adds 10° C. to the set temperature (140° C.+10° C.=150° C.) which will be the new set value. This assists recovery of the temperature loss on the cooking surface once a cold ingredient is introduced to the vessel. The first temperature sensor PID is still used to heat up the cooking vessel toward the new set temperature of 150° C.

When the temperature sensed by the second temperature sensor reaches within 20° C. of the new set temperature (150° C.−20° C.=130° C.), the target temperature for the PID of the first temperature sensor may be reset to the set temperature of 140° C.

During the whole process in this scenario, the PID of the first temperature sensor is the only temperature controller.

The cycle will start back from beginning if there is intervention on the set temperature.

Therefore, depending on the set temperature, the temperature of the ingredients and the temperature of the heating element, increased control using different heat profiles may be provided.

The controller may determine which, including one of, or both of the first and second temperature sensors to monitor to control the temperature of the heating element based on the selected cooking temperature. The cooking temperature may be selected by way of a selected cooking mode.

In a further example, each of the temperature sensors may be controlled by a separate PID controller. That is, a first PID controller may control operation of the first temperature sensor and a second PID controller may control operation of the second temperature sensor. For example, referring to FIG. 7, steps S707 and S719 may apply to controlling the first PID controller that monitors the temperature of the first temperature sensor (the heating element), and step S723 may apply to controlling a second PID controller that monitors the temperature of the second temperature sensor (the ingredients).

Therefore, the controller may determine which of, one or both of, the first and second temperature sensors to monitor to control the temperature of the heating element based on the selected cooking temperature.

It will be understood that the temperature ranges, temperature values, buffers and profiles that are used by the controller to switch from controlling the heater element using the first temperature sensor to using the second temperature sensor may vary depending on the cooking mode(s) and/or cooking temperature that has been selected and detected by the controller.

For example, it may be desirable to start monitoring the cooking process using one of the temperature sensors, switch to monitoring the cooking process using the other of the two temperature sensors, and then switch back to monitoring the cooking process using the original temperature sensor. This may repeat as often as necessary. Other permutations are also envisaged.

Further, the controller may retrieve at least one heat profile from memory. After retrieving the heat profile(s), the controller may compare one of the first and second temperatures (or both) with the retrieved heat profile. After comparing, the controller may adjust control of the heating element based on the comparison by either increasing or decreasing the power applied to the heating element, changing a temperature set value or increasing the amount of time a defined power is to be applied.

It will be understood that the kitchen device may display one or both of the two temperatures measured by the two temperature sensors.

Figure 8:
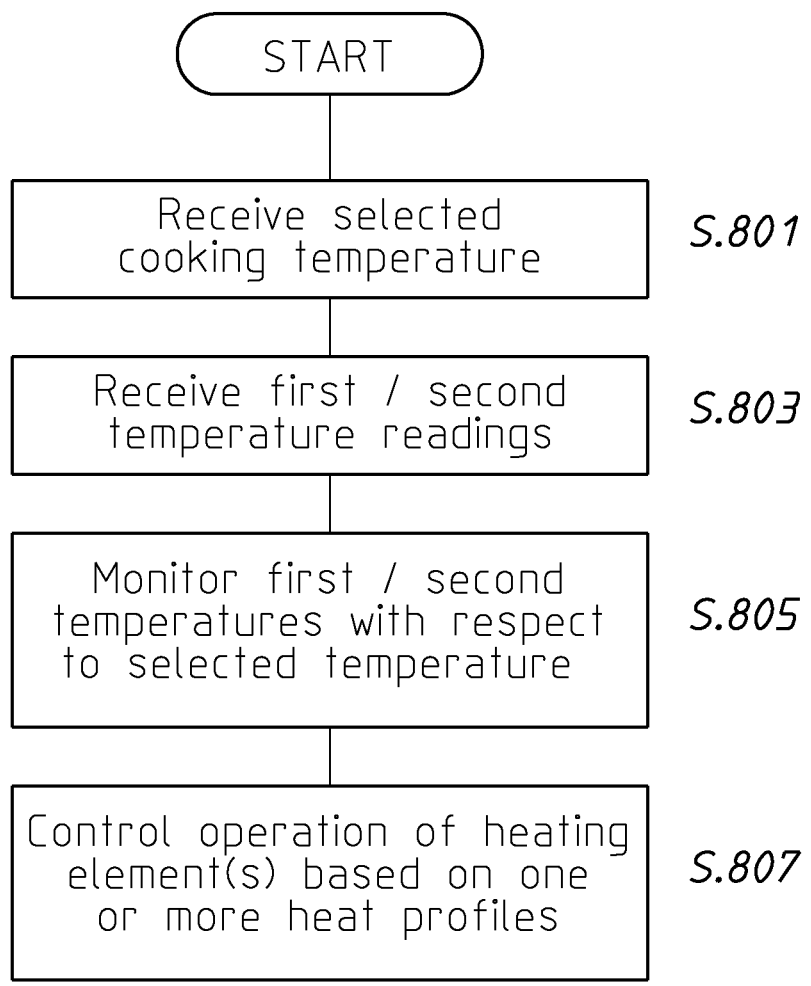
FIG. 8 shows a temperature control process according to an embodiment of the present disclosure.

Therefore, in accordance with FIG. 8, a cooking process may be controlled in a kitchen device, as follows.

At step S801, a desired cooking temperature may be received by the controller. This temperature may be received, for example, by way of a selected cooking process or sequence of processes, or by way of a set temperature. For example, various cooking processes may have a sequence of desired cooking temperatures at different times during the cooking process.

At step S803, the controller may receive a first temperature reading of a heating element and a second temperature reading of one or more ingredients being cooked in the cooking process. That is, the first temperature reading of the heating element may be sent from the first temperature sensor and the second temperature reading of one or more ingredients being cooked in the cooking process may be sent by the second temperature sensor.

At step S805, the controller may monitor the first and second temperatures with respect to the desired cooking temperature. For example, a single controller may be used to monitor the measured temperatures and control the heating element of the kitchen device accordingly. Alternatively, each temperature sensor may be associated with a separate PID controller that is selectively used by the controller to control the heating element.

At step S807, the controller may control operation of the heating element in accordance with one or more heat profiles based on the monitoring step of S805. For example, the heat profile may be as defined by the PID controller that is currently controlling the process (and its associated temperature sensor). Alternatively, the heat profile may be stored in memory and used by the controller to track the current temperature (whether the temperature of the heating element or the ingredients or both) and change the power, time or temperature settings being used to control the heating element to maintain the measured temperature as close as possible to the desired heat profile for the relevant temperature sensor.

An alternative temperature sensor fitting is now described.

Figure 9A:
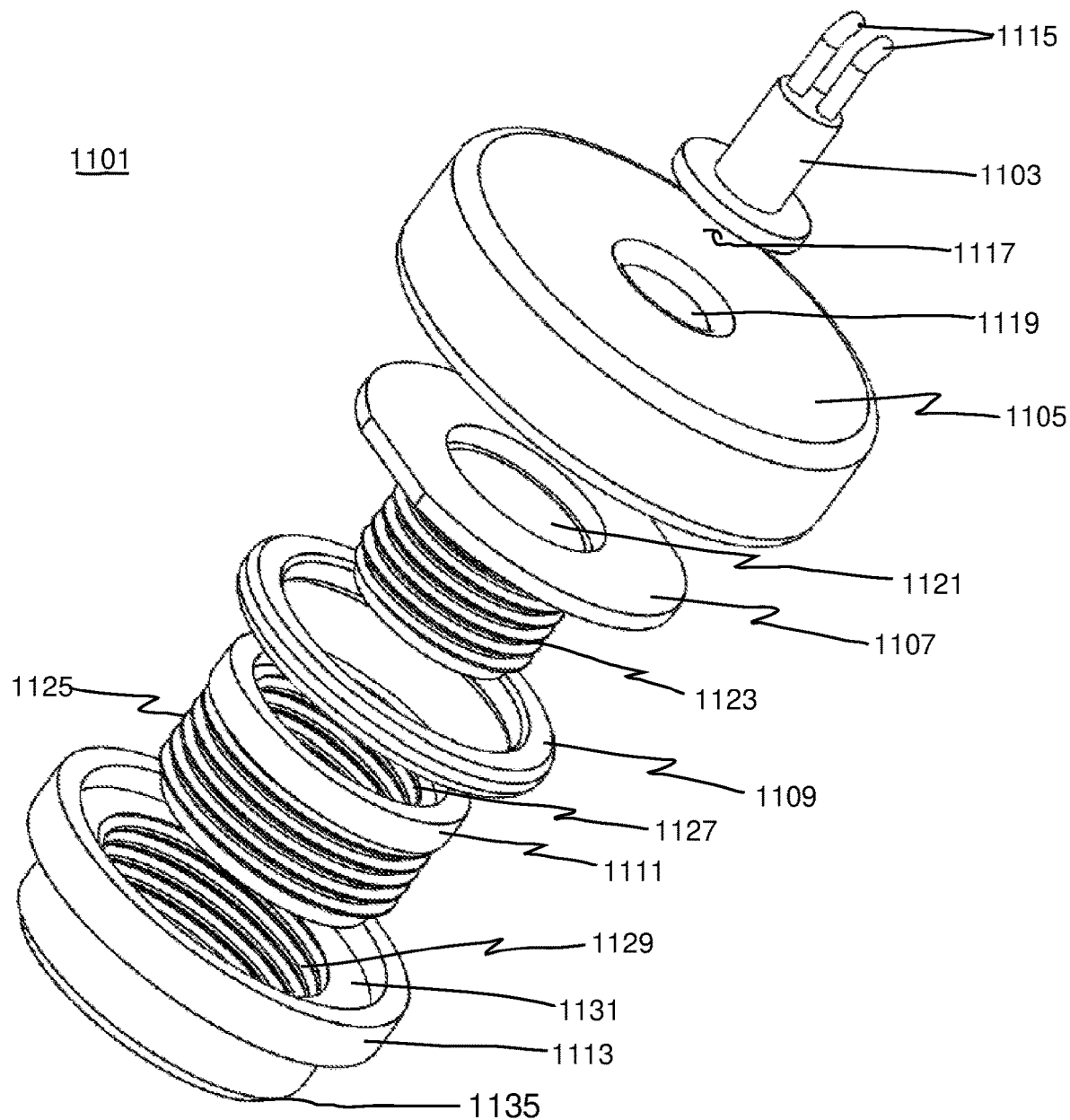
FIG. 9A shows an exploded view of a temperature sensor fitting according to the present disclosure.
Figure 9B:
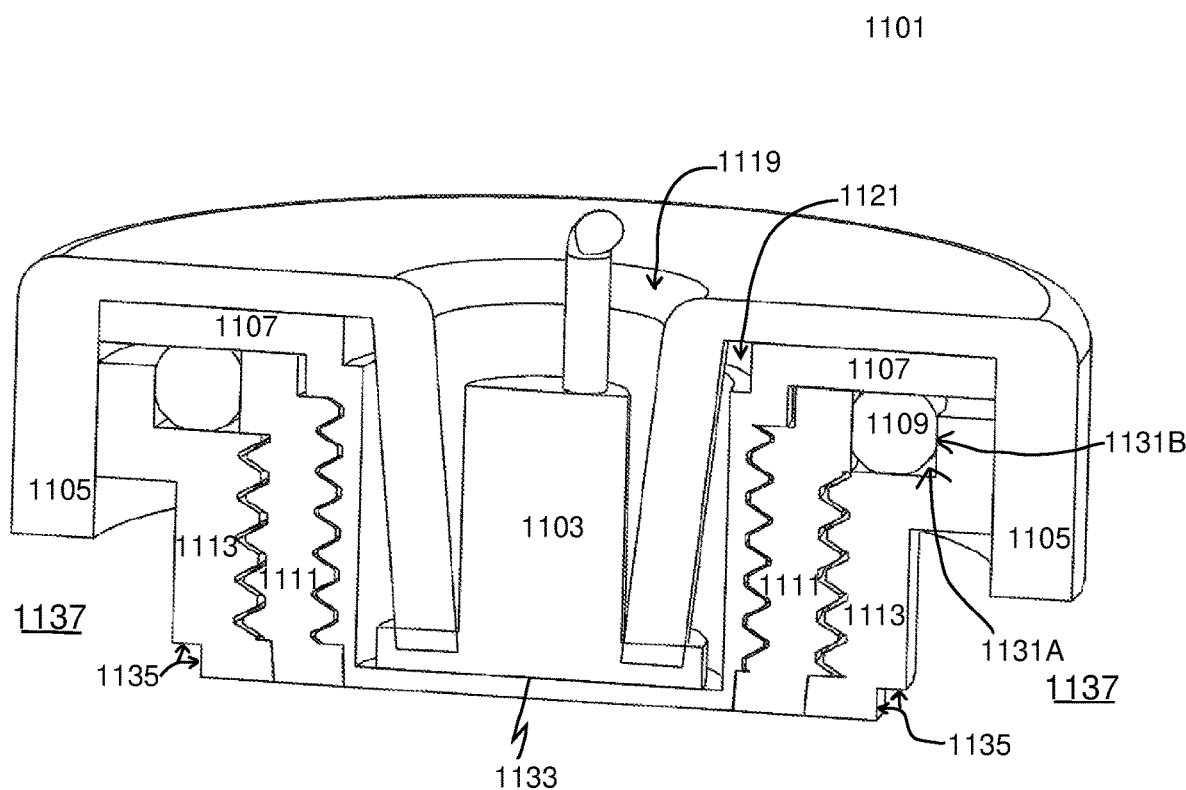
FIG. 9B shows an assembled cross section view of a temperature sensor fitting according to the present disclosure.

FIG. 9A shows an exploded view of a temperature sensor fitting 1101 with a temperature sensor 1103 that detects temperature of ingredients that are inside a cooking vessel of a kitchen device. FIG. 9B shows an assembled cross section of the temperature sensor fitting 1101.

In this embodiment, the temperature sensor fitting 1101 may be used in a kitchen device that is a multicooker food processing device. However, it will be understood that the temperature sensor fitting 1101 may be used in other suitable kitchen devices that require the temperature of items to be measured, such as a kettle, for example.

In this embodiment, the temperature sensor fitting 1101 has an outer secondary seal 1105, a threaded temperature sensor cap 1107, an O-ring 1109, a threaded insulator 1111 and a collar 1113.

The temperature sensor 1103 in this embodiment is an NTC temperature sensor that has two connecting wires (connecting wires 1115) and a temperature sensing surface temperature sensing surface 1117. The temperature sensing surface is placed in a position inside a cooking vessel so that temperature sensing surface 1117 comes in contact with the ingredients being heated by the kitchen device.

It will be understood that other forms of temperature sensor may be used as an alternative. For example, the temperature sensor may be a glass NTC bead.

The outer secondary seal 1105 is made from flexible silicon and has a central cavity 1119 that allows the connecting wires 1115 to pass through and connect to the control circuitry of the kitchen device. In this embodiment, the central cavity 1119 is a circular central cavity 1119 that is positioned in a central position on the outer secondary seal 1105. The central cavity 1119 may be any other suitable shape and positioned in any other suitable position. The outer secondary seal 1105 also has flexible outer walls that form an annular cavity, where the walls are arranged to flexibly encase the threaded temperature sensor cap 1107, O-ring 1109, threaded insulator 1111 and collar 1113 as shown in FIG. 9B.

The threaded temperature sensor cap 1107 is made from stainless steel in this embodiment. Other suitable heat conducting materials may be used as an alternative, such as other suitable metals.

An inner surface (1133 of FIG. 9B) of the threaded temperature sensor cap 1107 is in thermal contact with the temperature sensing surface 1117 of the temperature sensor 1103 (as shown in FIG. 9B). That is, threaded temperature sensor cap 1107 has an inner central cavity 1121 that is aligned with the central cavity 1119 of the outer secondary seal 1105. The inner central cavity 1121 allows the temperature sensing surface 1117 of the temperature sensor 1103 to pass through the inner central cavity 1121 and enable the temperature sensing surface 1117 to make thermal contact with the inner surface of the threaded temperature sensor cap 1107.

An upper circular flange of the threaded temperature sensor cap 1107 locates inside the outer secondary seal 1105.

A lower extended portion of the threaded temperature sensor cap 1107 has an outer threaded portion 1123.

The O-ring 1109 is arranged to pass around the outer threaded portion 1123 of the threaded temperature sensor cap 1107 and the upper surface of the O-ring 1109 is arranged to abut the lower surface of the upper circular flange of the threaded temperature sensor cap 1107.

The threaded insulator 1111 in this embodiment is made from PTFE. Any other suitable insulating material may be used as an alternative.

The threaded insulator 1111 has an outer threaded portion 1125 and an inner threaded portion 1127. The inner threaded portion 1127 of the threaded insulator 1111 corresponds with the outer threaded portion 1123 of the threaded temperature sensor cap 1107 to enable the outer threaded portion 1123 of the threaded temperature sensor cap 1107 to be screwed into the inner threaded portion 1127 of the threaded insulator 1111.

The collar 1113 has an inner threaded portion 1129 formed in a central cavity of the collar 1113. The inner threaded portion 1129 of the collar 1113 corresponds with the outer threaded portion 1125 of the threaded insulator 1111 to enable the outer threaded portion 1125 of the threaded insulator 1111 to be screwed into the inner threaded portion 1129 of the collar 1113.

The upper portion of the collar 1113 has a circular wall that forms a lower sealing surface 1131A and a side sealing surface 1131B used to seal against the O-ring 1109 (as shown in FIG. 9B).

The lower surface of the O-ring 1109 is arranged to abut the lower sealing surface 1131A and a side surface of the O-ring 1109 is arranged to abut the side sealing surface 1131B of the collar 1113.

As shown in FIG. 9B, the collar 1113 has an outer surface 1135 that is formed to correspond with an edge of a vessel floor 211 of a heating plate 212 of a kitchen device, where the heating plate 212 is formed from a heating billet 213 in thermal connection with the vessel floor 211 and a heating element 214.

Figure 10:
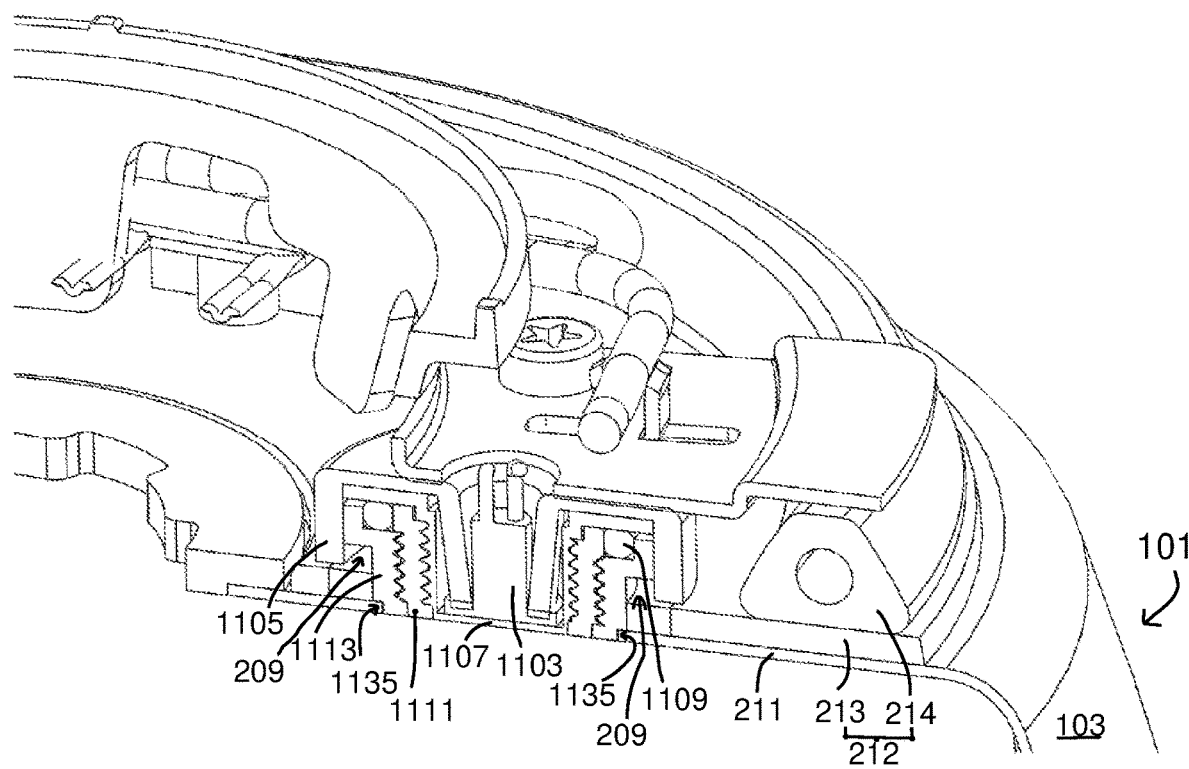
FIG. 10 shows an example of the temperature sensor fitting being used in a heating vessel of a kitchen device according to the present disclosure.

In this embodiment, the outer surface 1135 is an L-shaped step that corresponds with an L-shaped step of the floor 211 of the heating plate 212 as shown in FIG. 10.

The outer surface 1135 of the collar 1113 is suitable for welding to a corresponding edge of the vessel floor 211. For example, the outer surface 1135 may be laser welded to the edge of the vessel floor 211, or by any other suitable welding process. The laser welding provides an air tight pressure seal.

Referring to FIG. 9B, it can be seen that the threaded insulator 1111 provides thermal isolation between the temperature sensor 1103 and a position indicated by area 1137 where a heating plate 212 of the kitchen device is located. That is, the threaded insulator 1111 provides a thermal seal between the temperature sensor 1103 and the heating plate 212 when the temperature sensor fitting 1101 is in use in the kitchen device. Also, the threaded insulator 1111 reacts to the thermal expansion and retraction of the threaded temperature sensor cap 1107 and collar 1113 while maintaining a seal.

FIG. 10 shows an example of a temperature sensor fitting 1101 being used in a cooking vessel 103 of a kitchen device 101.

Also shown in FIG. 10 is an area 209 in which a further sealant, such as a silicon adhesive sealant, may be used in case of a reduction in the sealing properties of the weld seal formed at the outer surface 1135.

Figure 11:
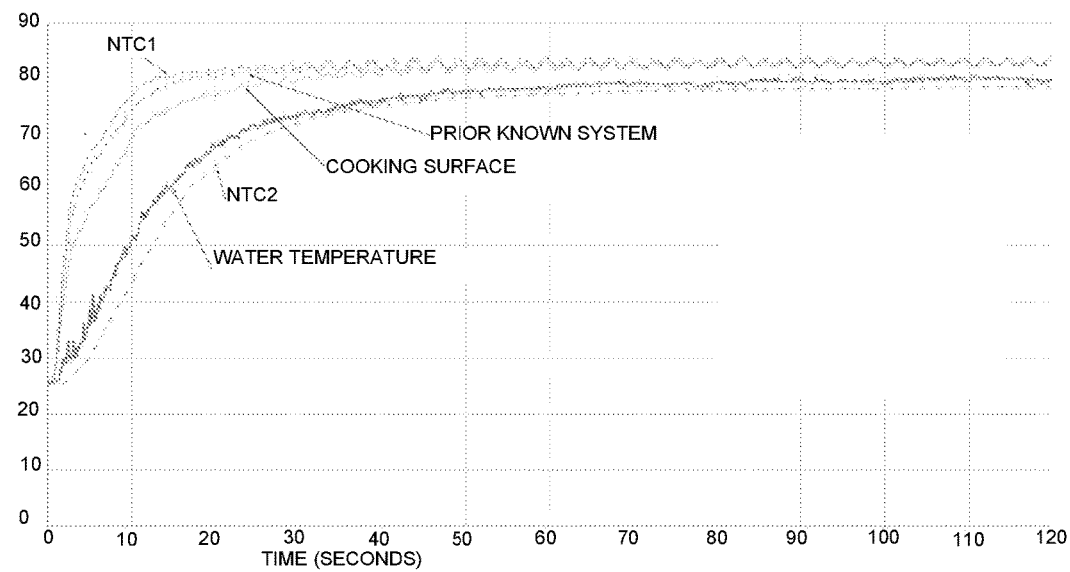
FIG. 11 shows a chart of measured temperature versus time according to the present disclosure.

FIG. 11 shows a chart of measured temperature versus time for various temperature sensor fittings. The chart shows the temperature of the actual cooking surface (i.e. the vessel floor 211) and water (the ingredient) inside the vessel at the water is being heated by the heating plate 212. The chart shows the temperature measured by a temperature sensor fitting of a prior known system compared to the actual temperature of the water. In the prior known system, the temperature reading is taken from an under side of the cooking surface. The chart also shows the temperature as measured by the temperature sensor (NTC2) of a temperature sensor fitting of an embodiment of the invention. NTC1 is a temperature taken from the heating element of the kitchen device.

It can be seen that the NTC2 temperature reading is much closer to the actual temperature of the ingredient than the prior known system and the cooking surface temperature thus providing an improved temperature sensing system.

Figure 12:
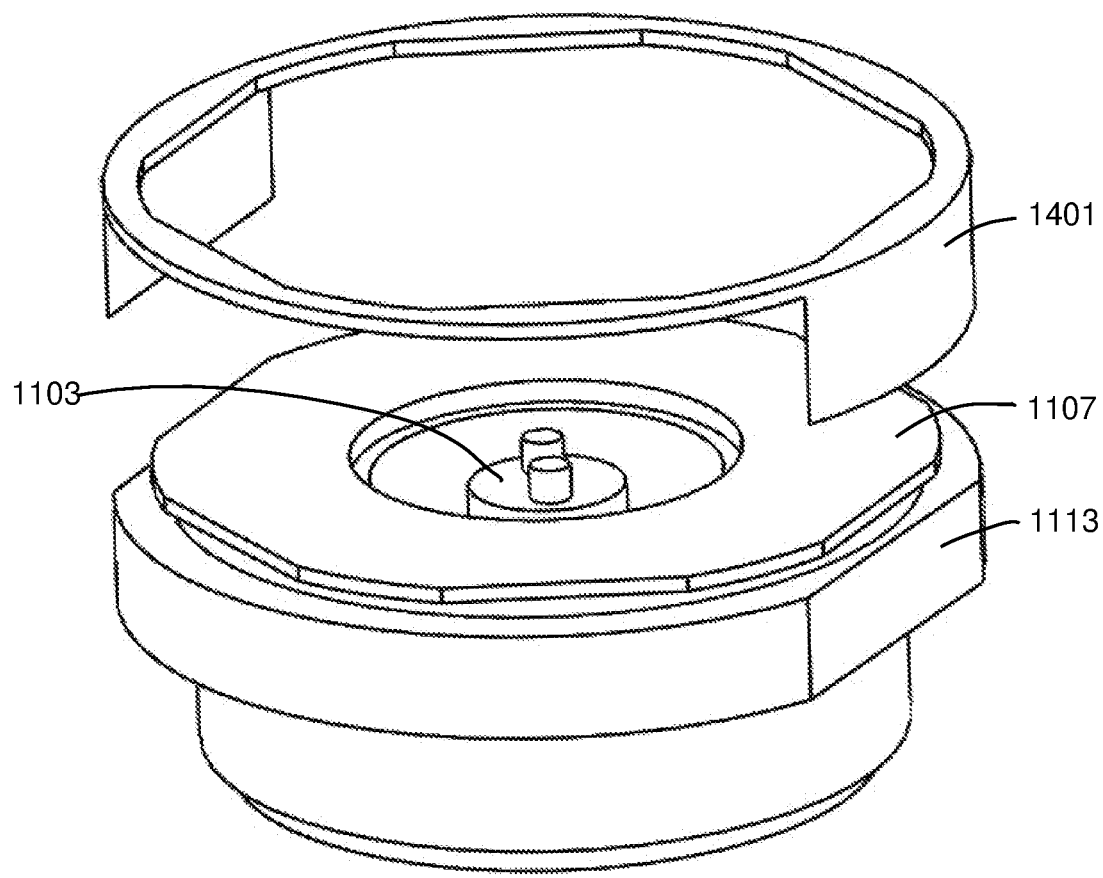
FIG. 12 shows a view of a temperature sensor fitting according to the present disclosure.

FIG. 12 shows a further example of a temperature sensor fitting where a locking collar 1401 is used to encase the collar 1113, the threaded insulator 1111 and the threaded temperature sensor cap 1107. Further the locking collar 1401 prevents the threaded temperature sensor cap 1107 from unscrewing.

Although the temperature sensor fitting 1101 is shown with the temperature sensor 1103 installed in FIGS. 9A and 9B, it will be understood that the temperature sensor fitting 1101 may be assembled separate from the temperature sensor 1103 and the temperature sensor 1103 may be installed later.

It will be understood that the O-ring 1109 of the temperature sensor fitting 1101 shown in FIG. 9A is an optional seal. For example, the threaded insulator 1111 may be formed such that it expands into the cavity in which the O-ring 1109 is shown to be located in FIG. 9B, in order to replace the O-ring 1109 with the extended portion of the threaded insulator 1111. As another example, the cavity in which the O-ring 1109 is shown to be located in FIG. 9B may be filled with an alternative seal in the form of an adhesive, or any other suitable sealant.

Further, it will be understood that the outer secondary seal 1105 is an optional seal. One example of an alternative arrangement is shown in FIG. 12. A further alternative is to encase the components in any other suitable manner such as by way of the inner and outer threads of the threaded temperature sensor cap 1107, threaded insulator 1111 and collar 1113.

The various arrangements described provide a very high thermal and liquid sealing efficiency as well as more accurate temperature readings of the actual ingredient being heated up.

The weld seal provides an improved liquid seal to reduce the risk of water ingress taking place during use and also when washing the cooking vessel in a dishwasher.

The temperature sensor 1103 is isolated thermally from both the vessel floor 211 and the heating plate 212. The threaded insulator 1111 assists with separating the temperature sensor 1103 from the heat generated by the vessel floor 211 and the heating plate 212. The collar 1113 weld seal provides a sealing solution for the temperature sensor fitting 1101. The threaded temperature sensor cap 1107 has a surface that is directly in contact with the ingredients and an opposing surface that is directly in contact with the temperature sensor 1103 to enable the temperature sensor 1103 to measure the ingredient temperature more accurately. Further, the O-ring 1109 has optional additional sealing functionality. Further, the outer secondary seal 1105 has optional additional secondary sealing for the temperature sensor fitting 1101.

Embodiments of the herein described kitchen device and associated method may have one or more of the following advantages. The use of a second temperature sensor to monitor the temperature of the ingredients being cooked may provide a benefit of using the data from the first temperature sensor (301) and second temperature sensor (309) to control the cooking process in terms of temperature and cooking time, and provide accurate power control as needed to achieve optimised and desirable cooking results and experience.

INDUSTRIAL APPLICABILITY

The arrangements described are applicable to the kitchen device and food processing industries and particularly for the multicooker control industry.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A kitchen device comprising:
a cooking vessel having a lower surface, a heating plate, a first temperature sensor and a second temperature sensor, wherein the first temperature sensor is thermally connected to, at least part of, the heating plate of the kitchen device for measuring the temperature of the heating plate, and the second temperature sensor is flush with the lower surface of the cooking vessel, and is located in a position to measure the temperature of one or more ingredients that are inside the cooking vessel, and the second temperature sensor is thermally isolated from the cooking vessel by a sensor isolation seal,
wherein the sensor isolation seal is comprised of two or more sensor isolation seal components, wherein a first sensor isolation seal is made of a first material and the second sensor isolation seal is made of a second material different to the first material, and the first sensor isolation seal is located within an internal aperture of the second sensor isolation seal.

2. The kitchen device of claim 1, wherein the position of the second temperature sensor is within an aperture of the cooking vessel and the heating plate.

3. The kitchen device of claim 1, wherein an air gap is provided between the sensor isolation seal and the heating plate.

4. The kitchen device of claim 1, further comprising a controller,
wherein the controller is arranged to:
monitor a first temperature from the first temperature sensor;
monitor a second temperature from the second temperature sensor;
receive a selected cooking temperature;
monitor the first and second temperatures from the first and second temperature sensors with respect to the selected cooking temperature; and
control operation of the heating plate based on monitoring of at least one of the first and second temperatures with respect to a heat profile.

5. The kitchen device of claim 4, further comprising a first PID controller for controlling the temperature of the heating plate based on the temperature of the first temperature sensor, a second PID controller for controlling the temperature of the heating plate based on the temperature of the second temperature sensor, wherein, the controller determines which of the first and second PID controllers are used to control the temperature of the heating plate based on the selected cooking temperature.

6. The kitchen device of claim 4, wherein the controller is further arranged to retrieve the at least one heat profile from memory, compare at least one of the first and second temperatures with the heat profile, and adjust control of the heating plate based on the comparison.

7. The kitchen device of claim 4, wherein the controller determines which of, one or both of, the first and second temperature sensors to monitor to control the temperature of the heating plate based on the selected cooking temperature.

8. The kitchen device of claim 1, wherein the heating plate comprises a heating element and a heating billet, and the first temperature sensor is thermally connected to the heating billet.

9. The kitchen device of claim 1, wherein the first material and the second material have different thermal masses.

10. The kitchen device of claim 1, wherein the first sensor isolation seal comprises a protuberance and the second sensor isolation seal comprises a groove for receiving the protuberance of the first sensor isolation seal.

11. The kitchen device of claim 1, wherein the second sensor isolation seal is below the lower surface of the cooking vessel.

12. The kitchen device of claim 11, wherein the second sensor isolation seal is outside the cooking vessel.

13. The kitchen device of claim 11, wherein the second sensor isolation seal is spaced apart from the heating plate, such that an air gap separates the second sensor isolation seal and the heating plate.

14. A method of controlling a cooking process in a kitchen device according to claim 1, the method comprising:
receiving a selected cooking temperature;
receiving a first temperature reading of a heating plate and a second temperature reading of one or more ingredients being cooked in the cooking process;
monitoring the first and second temperatures with respect to the selected cooking temperature; and
controlling operation of the heating plate in accordance with at least one heat profile based on the monitoring of the first and second temperatures.

15. The method of claim 14 further comprising the steps of controlling the temperature of the heating plate based on the temperature of the first temperature sensor, controlling the temperature of the heating plate based on the temperature of the second temperature sensor, wherein determining which of the first and second temperature sensors are to be used to control the temperature of the heating plate is based on the selected cooking temperature.

16. The method of claim 14 further comprising the steps of retrieving the at least one heat profile from memory, comparing at least one of the first and second temperatures with the heat profile, and adjusting control of the heating plate based on the comparison.

17. The method of claim 14 further comprising the steps of determining which of, one or both of, the first and second temperature sensors to monitor to control the temperature of the heating plate based on the selected cooking temperature.

* * * * *